Aug. 17, 1965          G. F. KEELERIC          3,200,489
METHOD OF MAKING HONEYCOMB CORE
Filed June 18, 1957          3 Sheets-Sheet 3
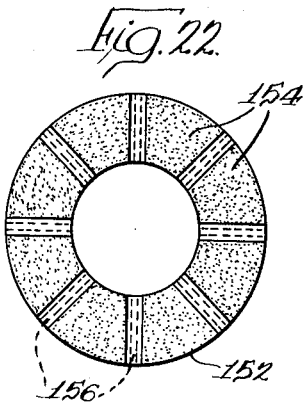
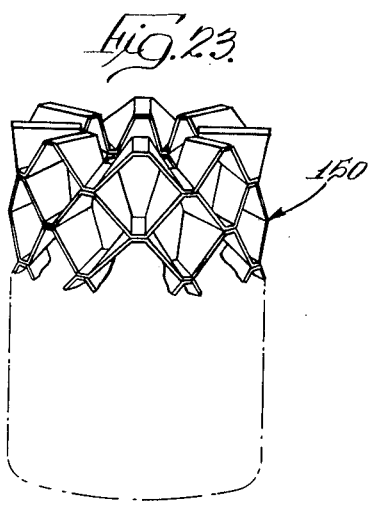
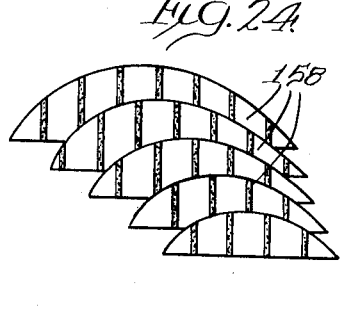
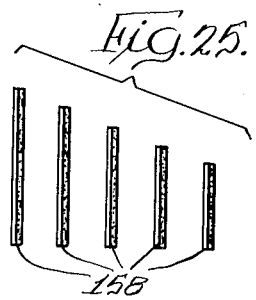
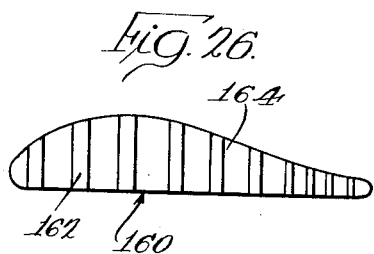
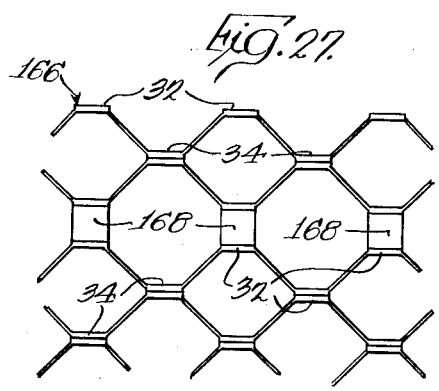
INVENTOR.
George F. Keeleric
BY
Wupper, Gradolph & Love
Attys.

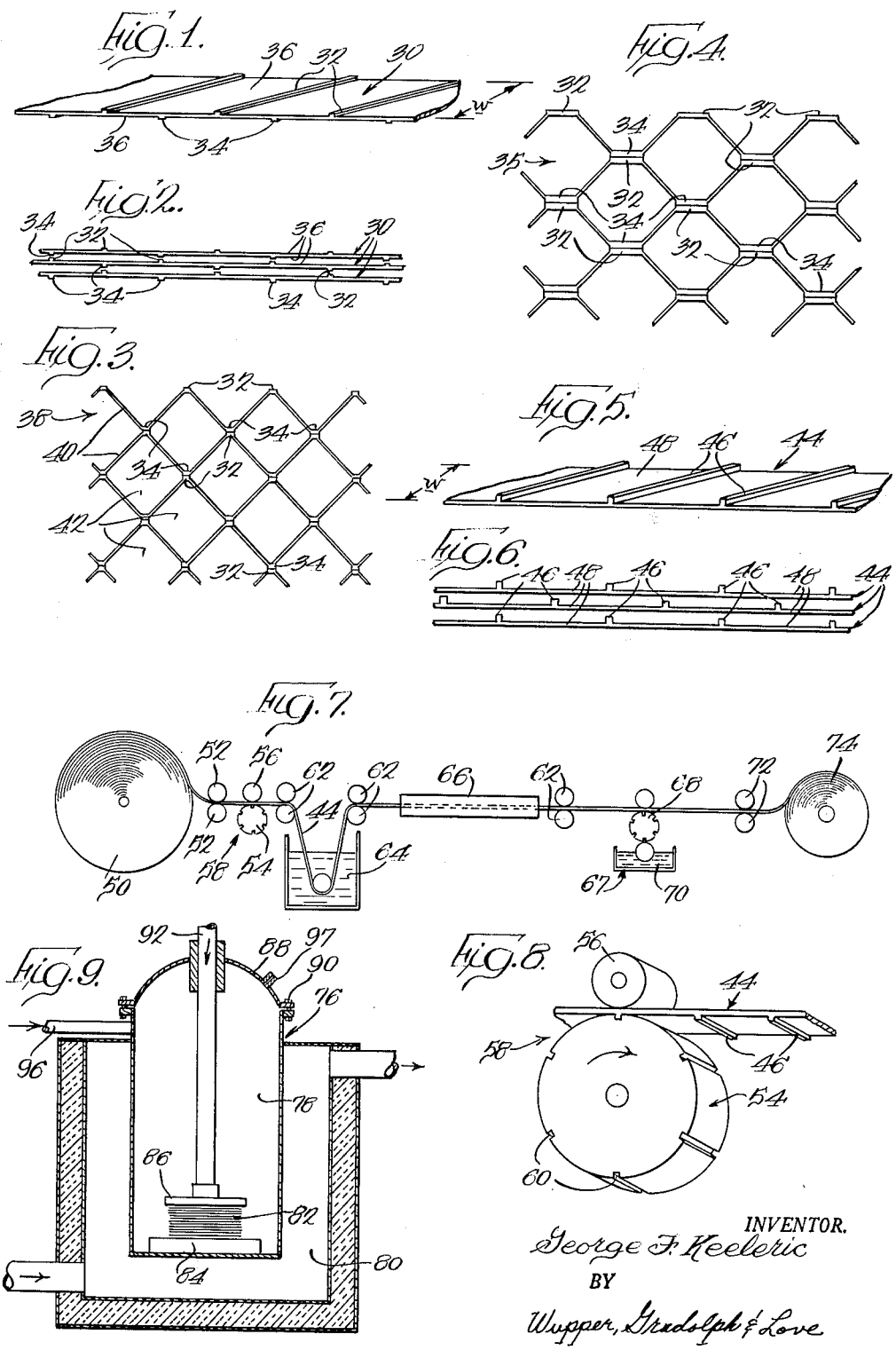

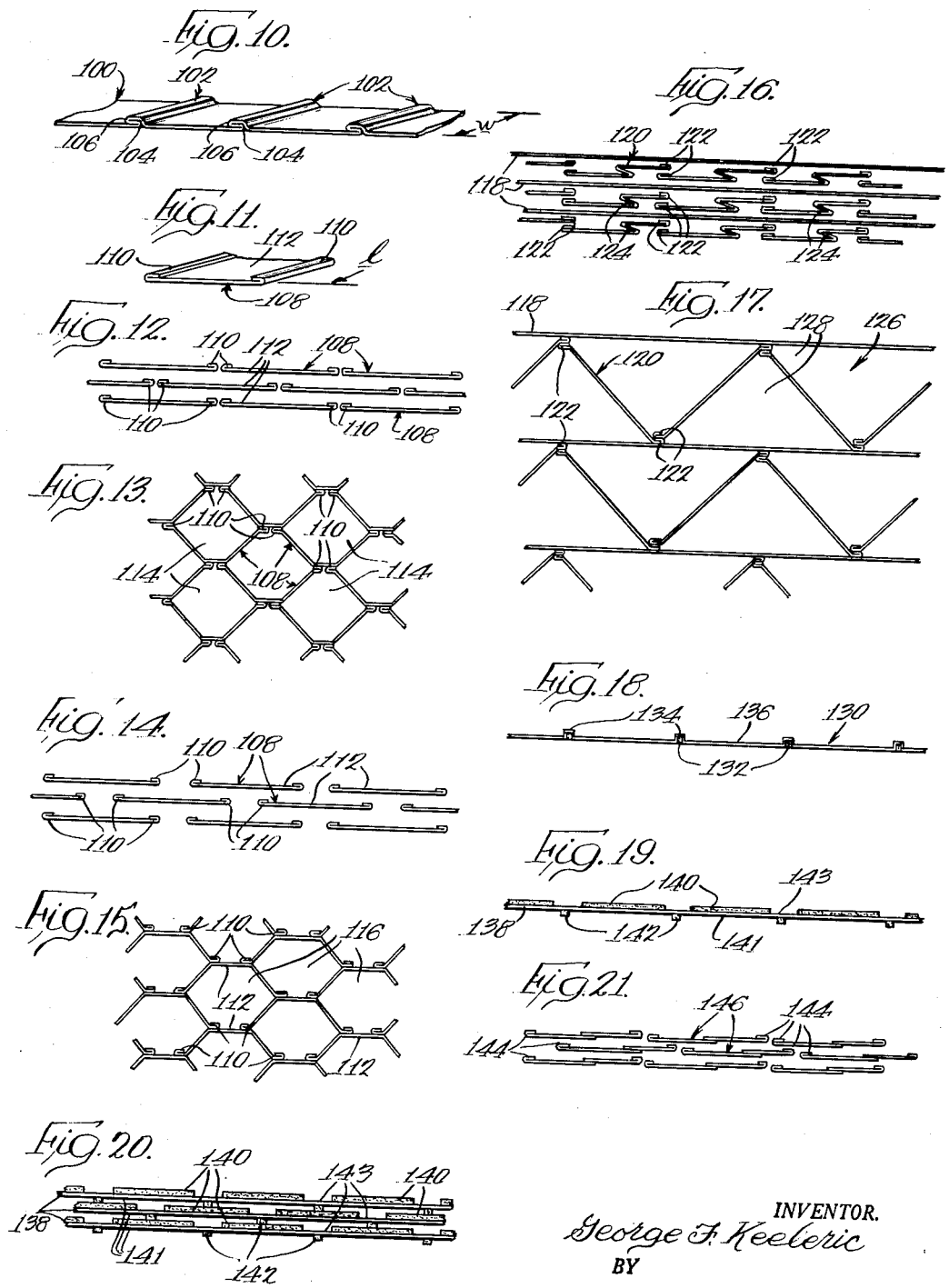

United States Patent Office 3,200,489
Patented Aug. 17, 1965

3,200,489
METHOD OF MAKING HONEYCOMB CORE
George F. Keeleric, Dundee, Ill. (Big Sur, Calif.)
Filed June 18, 1957, Ser. No. 666,383
3 Claims. (Cl. 29—470.9)

The present invention relates to a new and improved method of making honeycomb core and other corrugated structures of similar type, and the honeycomb core made thereby.

Honeycomb core is structural material or block consisting of relatively thin, corrugated sheets secured to each other along the wave crests or nodes of the corrugations. It may be made of any kind of material which may be formed into thin sheets, such as paper, particularly plastic impregnated paper, reinforced cotton, aluminum, stainless steel, and the like.

Honeycomb core is especially useful in applications where high strength to weight ratios are desired. In this connection, honeycomb core is particularly useful in the aircraft industry for airfoil sections or panels which may be made with shaped honeycomb core to which the skin sheets are firmly secured. The use of honeycomb cores in such instances eliminates the need for internal supporting members, ribs, stiffeners, brackets, and the like. Honeycomb core is also useful in the building of structures where panels of light weight and high strength are desired. Examples of such uses include duct work, pressurized and storage tanks, heat exchangers, thermal and acoustical insulation, walls (especially movable partitions), doors, vehicle bodies, refrigerators, and the like.

Heretofore, honeycomb core has been produced by several different methods, depending upon the material from which the honeycomb core is made and its ultimate use. Honeycomb core in which the sheets consist of paper, plastics, aluminum, and the like are commonly made by applying parallel strips of adhesive across the sheets at definite and regular intervals and then stacking the sheets one on top of the other in such manner that every other sheet is displaced laterally in such a way that its adhesive strips lie parallel to, but intermediate of, the equally spaced adhesive strips on the two adjoining sheets. The sheets or foils thus prepared are then pressed together, and usually heat is applied to set or cure the adhesive. Subsequently the contacted and adhered foils are expanded into the honeycomb core.

Honeycomb core produced in this manner suffers from the disadvantage that the adhesive or bonding material is in many cases inferior to the base sheet material either in physical strength or its resistance to heat, corrosion, aging, and the like.

Honeycomb core for high temperature applications is made from sheets of stainless steel or other refractory metals or alloys by a method incorporating spotwelding the partly corrugated sheets along the contacted nodes of superposed sheets. Commercially, twenty spotwelds per inch of node are required to obtain an adequate strength of the core. Due to the welding operation, which is usually performed by hand, although some automatic machines have been developed and are in use, this method is very time-consuming and costly, and cannot produce continuous adherence along the length and across the width of the contacted nodes. Cores of this type cannot be used in many desirable applications. For example, they cannot be used for heat exchangers, as a liquid or gastight seal between the adjacent or adjoining cells is not obtainable by the spotwelding method of fabrication. The spotwelding technique is difficult of application where very deep cells are required, particularly if the cells are relatively small in cross sectional area.

It is obvious, therefore, that the processes of the prior art as known to date, and the honeycomb cores made thereby, are subject to many practical disadvantages.

It is, therefore, a principal object of the present invention to provide a new and improved method of making honeycomb core which overcomes all of the disadvantages of the methods discussed above, and other methods known at this time.

Another object is to provide a new and improved method of making honeycomb core wherein the contacted surfaces between adjacent foils or sheets are securely and permanently bonded and are liquid and gas tight in the joints formed therebetween.

Another object is to provide a new and improved method of making honeycomb core wherein the sheets or foils forming a core are joined together without the use of a binding or bonding agent such as adhesive, welding, or brazing material, and yet a continuous adherence is obtained along the length and across the width of the contacted areas or nodes of superposed sheets or foils.

Another object is to provide a new and improved method for making honeycomb core, wherein no bonding agent of any kind is required, but wherein the sheets are pressure welded together by recrystallization of one metal sheet with a superposed like metal sheet.

Another object is to produce a honeycomb core wherein the bonded area of the sheets has a melting point higher than the basic sheet material.

Another object is to provide a new and improved method of producing honeycomb core of superior quality, having a greater variety of uses as compared with honeycomb core produced by known methods, with such production at a reduced cost.

Other objects and advantages will become apparent from the following description, taken in conjunction with the accompanying drawings, wherein FIG. 1 is a fragmentary perspective view of one form of sheet or foil useful in making honeycomb core and having nodes formed on both sides thereof;

FIG. 2 is an elevational view showing stacked sheets or foils prior to adhering them together;

FIG. 3 is an end view of a fragment of a honeycomb core made from sheets or foils of FIGS. 1 and 2;

FIG. 4 is a view similar to FIG. 3, but showing another form of honeycomb core wherein the nodes are substantially wider than the nodes of the sheets and foils and cores shown in FIGS. 1 to 3, to give a different shape cell;

FIG. 5 is a view similar to FIG. 1, showing another form of sheet or foil having the nodes formed on only one side thereof;

FIG. 6 shows the stacked arrangement of the sheets or foils of FIG. 5, to produce a honeycomb core having a substantially square cell structure;

FIG. 7 is a diagrammatic view of a typical processing line for forming the sheet material or foils useful in making honeycomb core in accordance with the principles of this invention;

FIG. 8 schematically illustrates a grooved forming roller and pressure roller useful in manufacturing the foils of FIG. 5;

FIG. 9 is a schematic view of an oven and pressure applying means for compacting and heating the stacked foils during the bonding thereof;

FIG. 10 is a view similar to FIGS. 1 and 5, showing another node structure;

FIG. 11 is a fragmentary perspective view of a strip wherein the nodes are formed along the marginal edges of the strip and is useful in making honeycomb core of deep cellular structure;

FIG. 12 illustrates a first method of stacking the strips of FIG. 11, prior to their being compacted and adhered;

FIG. 13 illustrates honeycomb core obtainable from the sheets stacked as shown in FIG. 12;

FIG. 14 illustrates a second method of stacking the strips of FIG. 11, prior to their being compacted and adhered;

FIG. 15 illustrates a honeycomb core obtainable from the sheets stacked as shown in FIG. 14;

FIG. 16 is a view similar to FIGS. 2 and 6, showing still another method of stacking or layering sheet material for the formation of honeycomb core;

FIG. 17 illustrates honeycomb core formed from the foils stacked as shown in FIG. 16;

FIG. 18 is illustrative of another method of forming the spaced nodes on the sheets or foils;

FIG. 19 shows still another method of defining contacting surfaces on the foils;

FIG. 20 illustrates the method of stacking the sheets or foils of FIG. 19;

FIG. 21 is illustrative of another method of stacking a slightly modified form of ribbon foil of the type shown in FIG. 11;

FIG. 22 is a top view of a circular sheet useful in making a tubular honeycomb core;

FIG. 23 is a perspective view of a tubular honeycomb core with the cell structure normal to the tube axis;

FIGS. 24 and 25 illustrate one method of making a contoured honeycomb core;

FIG. 26 is a view of an airfoil section wherein the core structure is heavier at the nose of the structure than at the trailing edge; and FIG. 27 is a view similar to FIG. 4, showing how fastening blocks may be incorporated into the core.

While there have been shown in the accompanying drawings, and there are described in the following specification, a number of different specific types of foils, strips, sheets, and a variety of methods of making or defining the contacting areas or nodes, and several methods of arranging the sheets to produce honeycomb cores of different structural and cellular characteristics, these are but illustrative of the results which may be obtained from following the fundamental and basic teachings of this invention.

I have discovered that it is possible, by carefully controlling the conditions, to adhere one sheet of metallic material to another sheet of similar metallic material at regularly spaced intervals on the sheets, by recrystallization or pressure welding. This process does not need a welding flux, a welding torch, or the application of heat in intensified form at the specific spots on the weld, as is required in arc welding. I have found that it is possible by this process to manufacture honeycomb core of such materials as stainless steel, aluminum, aluminum alloys, copper alloys, and the like. In general, I have found that by forming or defining nodes on at least one surface of a thin metallic foil which is to be adhered to a thin foil of similar metallic material, and by "stopping off" the spaces between the nodes, that it is possible to weld the nodes of one foil to an exposed metallic surface on the superposed foil. Thus, by arranging the superposed foils in stacks and offsetting them in a desired manner, I am able to make a honeycomb core having cellular characteristics, sizes, and depths which hitherto might have been considered relatively impossible, particularly when it would be necessary to follow the highly conventional welding techniques.

Therefore, the following description and the illustrative drawings are intended to be typical rather than limitative of this invention. The process contemplates (1) providing a plurality of sheets or foils on which are formed or defined a pattern of contacting surfaces or nodes; (2) stopping off the areas between contacting surfaces or nodes on each sheet with a material capable of transmitting pressure in the node or contacting surface areas; (3) stacking the sheets in a predetermined manner; (4) applying static pressure normal to the planes of the stacked sheets, while heating them in a compatible atmosphere, to adhere them together without attenuating the metal of the sheets, and (5) expanding the adhered stack into the honeycomb core.

Referring first to FIGS. 1, 2, and 3, metallic sheets, foils, or ribbons 30, which may be of stainless steel, are provided with comparatively narrow cross strips 32 raised above the general thickness of the foil on one face, and similar strips 34 on the other face. These raised ribs 32 and 34 may be formed in any typical manner, as will be explained hereinafter. The foil or sheet, prior to processing, may be .002 inch thick and after processing its thickness at the raised node forming strips 32 and 34 would be .002 inch, while at spaces 36 the thickness would be .0015 inch. It is appreciated, therefore, that the node forming ribs are but .0005 inch higher than the adjacent material. The space 36 on both the top and bottom faces of the sheet or foil 30 are coated with a stop-off material which preferably is aluminum oxide in a binder, commercially known as Wall-Columony Nicobraze cement thinned with acetone. It is only necessary or desirable that the binder not carbonize substantially under the application of substantial heat and pressure, but should disappear during the processing of the sheets into the honeycomb core. The stop-off material is applied in a thickness substantially the height of the node strips 32 and 34.

The function of this stop-off material is twofold; first, it prevents welding of the surfaces 36 of the material between the nodes, and secondly, as will appear hereinafter, it provides support for the between node sections of the sheets during the application of pressure and heat.

A plurality of foils, sheets, or ribbons 30 thus formed with nodes 32 and 34 and coated with stop-off material are stacked one on top of the other as shown in FIG. 2, with the faying surfaces of the nodes 34 contacting the faying surfaces of the nodes 32. It should be noted that the nodes 32 and 34 are offset one-half the distance between nodes 32 or 34 so as to make a honeycomb core having nearly square cellular structure with very small nodes.

Enough sheets, foils of ribbons 30, are stacked to produce a core of predetermined size. The stacked sheets are placed in an oven and subjected to substantial pressure and heat in an inactive or reducing atmosphere until recrystallization welding between contacted nodes 32 and 34 is completed. It should be noted that the surfaces of the nodes 32 and 34 must be clean and free of oils and other impurities which would resist the bonding action between the materials. If substantially pure material is presented for the welding operation it can take place with substantial ease and an extremely solid and liquid and gastight weld will result between each of the nodes 32 and 34. I have found, for example, that if the base material 30 is Armco–17–7PH stainless steel, the temperature at which the welding takes place is preferably at 1950° F. plus or minus 25° F., and the pressure should be approximately 500 pounds per square inch. It should be noted with emphasis that the temperature used in this process is well below the melting temperature of the material used, regardless of what material is used. Thus, it differs from conventional welding which uses substantially higher temperatures to bring the metal to or near melting temperatures.

At the conclusion of the welding time, the compressed and adhered ribbons are pulled apart or expanded to make a honeycomb core 38, as shown in FIG. 3. It is preferable for metallurgical reasons that the expansion of the compressed ribbons into the core be made at or near the welding temperature. This is particularly true if the material from which the honeycomb core is made belongs to the class of precipitation hardening alloys, as faster cooling of the core is more easily obtained. If alloys are used which are brittle at room or lower temperatures, the core must be expanded hot.

In the illustration of FIGS. 1, 2, and 3, the width $w$ of the ribbon 30 determines the depth of the honeycomb core, the walls 40 of cells 42 being formed by the ribbon material between the welded nodes 32 and 34.

FIG. 3 shows a honeycomb core wherein the nodes are of such size as to produce cells 42 of substantially square cross section. If the nodes 32 and 34 are made substantially wider, a hexagonal core 35 as seen in end view in FIG. 4, may be produced by the identical technique.

In FIGS. 5 and 6 there are shown a foil and a stacking arrangement for making a honeycomb core of the square cell type shown in FIG. 3. Foil, sheet, or ribbon 44 is formed with a plurality of raised strips 46 across the width and only on one face thereof. These strips have a height, as in the form shown in FIGS. 1 to 4, of about .0005 inch above the base material. Spaces 48 between the node forming strips 46 are coated with the stop-off material, and the ribbons or sheets 44 are stacked so that every other one is displaced one-half the distance between the node forming strips 46 in relation to the two adjoining strips. In this form it should be noted that the nodes being formed on only one surface of the sheet 44, the stop-off material is applied only to that surface of the ribbon whereon the nodes 46 are formed, the other surface of the material being perfectly plain, and at any point thereon where the node's faying surface is contacted, the node will be permanently adhered, welded, or bonded to the superposed sheet 44. During the pressing operation the stop-off material supports the stacked sheets against collapse between nodes.

In FIGS. 7, 8, and 9, there are shown schematically apparatus useful in preparing the foils, sheets, or ribbons previously described, and in pressure welding them together. This equipment is illustrated particularly in conjunction with the type of foil or ribbon of FIG. 5.

Referring first to FIG. 7, the ribbon material is supplied in coils 50 having a width approximately equal to the width of the ribbon finally produced. It is fed between guide rolls 52 and between a node forming roll 54 and a back-up pressure roll 56 at a node forming station 58. At this station the nodes 46 or the nodes 32 and 34 are formed in the material. Generally, the original material will have a thickness at least equal to the thickness of the foil 44 at the nodes 46 and will be thinned in a cold rolling process at 48 between the nodes, as well known in the art. Hot rolling of the strip followed by an adequate descaling may be desirable in certain instances.

FIG. 8 schematically shows a typical pressure roll 54 having a plurality of transverse peripheral grooves 60 formed therein into which the material of the ribbon 44 is compressed by the back-up or pressure roll 56 during the forming operation in order to form the ribs 46 which provide the faying surfaces for the nodes.

After the nodes have been formed on either or both faces of the ribbon, the latter is passed over guide rolls 62 into a degreasing and cleansing bath or tank 64.

After the ribbon 44 has been treated in the degreasing and cleansing bath 64, it is passed through a hydrogen or reducing atmosphere in the oven 66 to remove surface oxides. Leaving the oven 66 and another set of guide rolls, the prepared and cleansed ribbon 44 moves to station 67 where a coating roll 68 coats the surface of the ribbon between the nodes 32 and 34, or 46, as the case might be, with the stop-off material 70 which may be of the type previously mentioned. The thus prepared strip material passing through still another set of guide rolls is wound into a coil 74 preparatory to being cut into suitable lengths, stacked, and placed in a processing oven.

A typical oven 76 is schematically shown in FIG. 9. This oven has a processing chamber 78 surrounded by a combustion chamber 80 supplied with fuel in any conventional manner. The stack of ribbons or foils indicated generally at 82 is confined between a base plate 84 and a pressure plate 86, the upper foil of the stack being adhered to the plate 86 and the lower foil of the stack being adhered to the plate 84. Cap 88 of the treatment chamber 78 is removably secured to the chamber by suitable fastening means 90 and a pressure applying plunger 92 passes through a stuffing box 94 in the cap and is secured at its lower end to the pressure plate 86. As is obvious from FIG. 9, the base plate 84 and pressure plate 86 will operate to apply pressure simultaneously uniformly to the stack of foils 82 confined therebetween as aforesaid.

It is preferred that the welding be effected in an inert or reducing atmosphere. It may be an inert gas such as argon or helium, or a mixture of such gases, or a vacuum. It is essential, however, that it not be an oxidizing atmosphere, as such would inhibit the process of recrystallization or pressure welding. The gas for the inert or reducing atmosphere is admitted to the chamber 78 through the pipe or conduit 96, is circulated through the chamber, and together with any impurities, leaves through the restricted vent opening 97.

After the sheets have been stacked as indicated at 82, pressure is applied through the plunger 92 and the chamber 78 is heated to the desired temperature to weld the faying surfaces of the nodes and sheets together. The pressure, temperature, and welding time depend upon the nature and character of the material. As noted hereinbefore, when the base material is Armco–17–7PH stainless steel, the recrystallization welding temperature is about 1950° F. and the pressure is about 500 p.s.i. The welding temperatures, pressure, and time will vary and depend upon the character of the base material.

After the welding time has elapsed and it is certain that the node surfaces have been welded to the adjacent metal surfaces, the pressure applied through the plunger 94 is relieved and the plunger lifted in the upward or reverse direction, preferably while maintaining the welding temperature in the chamber 78. The topmost foil or ribbon is moved upwardly and away from the lowermost foil or ribbon held by the base plate 84, thereby expanding the intermediate foils into the honeycomb core. When the expansion has been completed and the assembly cooled down, the entire assembly of plates 86 and 84 and the honeycomb core may be removed by opening the connections 90 and removing the chamber top 88 after which the expanded core may be separated from the pressure plate 86 and base plate 84. If desired, the cooling may be effected in a cooling chamber where the rate of cooling can be controlled, or in the air.

In FIG. 10 there is shown another form of ribbon having nodes positioned as shown in FIG. 5. In this form a ribbon 100 has a plurality of nodes 102 formed on one face thereof by folding the ribbon back and forth upon itself at the bends 104 and 106. In this case the node 102 will stand above the surface of the adjacent portion of the ribbon 100 by twice the thickness of the ribbon material. The stop-off material is applied between the nodes 102, and the depth of the core which can be formed is the width $w$ of the ribbon as indicated in FIG. 10. During the welding operation the ribbon folds, forming the nodes 102, will be welded together so that during the expansion step the ribbon folds forming the nodes 102 will not become separated.

In FIG. 11 there is illustrated a ribbon 108 which is useful in making honeycomb core of deep cellular structure. This ribbon, instead of having nodes formed or raised at spaced points along its length, has a pair of node forming folds 110 along its longitudinal marginal edges which are formed by rolling over a narrow width of the ribbon at the node forming station 58 (FIG. 7). Thus, instead of subjecting the ribbon 108 to pressure to form nodes like those shown in FIGS. 1 and 2, the ribbon is folded and compressed in order to form shallow marginal ridges 110. The stop-off material is coated onto the ribbon at the coating station 66 in space 112 between the marginal edges 110. In this case the depth of the core is equal to the length *l* of the ribbon, which is stacked.

FIG. 12 shows a method of using the ribbon of FIG. 11 in forming a honeycomb core. The ribbons 108 are arranged so that rolled edges 110 of adjacent ribbons are close to each other and in superimposed layers of ribbon are offset or displaced approximately one-half the distance between the nodes 110 in relation to adjoining layers of ribbon 108. When these ribbons thus disposed have been subjected to heat and pressure and then expanded, a honeycomb core cell of generally rectangular cross section will be formed, as shown in FIG. 13, wherein the cores or the cells 114 are approximately square. It will be noted that it is necessary in this case to coat the ribbon with stop-off material on only one face, and that when the square cells are desired the displacement is such that the adjacent node strips 110 lie between node strips 110 of the superposed ribbon 108.

If, however, a hexagonal shaped core 116 is desired, then the ribbons are disposed as shown in FIG. 14 and the nodes 110 are disposed at approximately the one-third point of superposed adjacent ribbons 108. This disposition of the ribbons and node forming strips 110 when compacted and welded into a unitary structure and expanded will provide a honeycomb as shown in FIG. 15.

FIGS. 16 and 17 show still another arrangement for forming the strips and the honeycomb core which may be made therefrom. In this arrangement uncoated sheets of material 118 are interleaved with folded strips 120 which have node forming marginal edges 122 of the type shown in FIG. 11. Intermediate the marginal edges the strips are doubled back and forth upon each other at 124. This double fold is made after the stop-off material has been applied to the sheets in order to prevent the folds 124 from being welded together and thus incapable of expansion. It is preferred in this case that both faces of the strips 120 be coated with the stop-off material adjacent the double fold at 124 in order adequately to prevent the welding from taking place. It should be observed that the node edges 122 are stacked one on top of the other, thus providing four thicknesses of material at the places where the welds are to occur, while intermediate those stack areas the maximum number of sheet thicknesses is only three. Thus there will be less pressure at the places where the sheets are folded at 124 than at the node forming edges 122. After the welding has taken place and the welded sheets 118 and 120 have been expanded, the honeycomb structure 126 with triangular cells 128, such as shown in FIG. 17, will be provided. This is possible because the double fold 124 in the ribbons 120 will unfold to provide the straight sides for the triangular cell.

FIG. 18 shows another method of making a ribbon of the type shown in FIG. 5. In this form a ribbon 130 is folded to provide small rectangular or square openings 132 at the underface thereof defined by three walls, the upper horizontal wall 134 providing the faying surface of the node. In order to provide support for this ribbon in the process of heat and pressure treatment in the oven, the hollow node forming cell 132 is filled or packed with the stop-off material such as aluminum oxide. This material in addition to preventing adherence at this point also lends physical support and prevents compacting. The upper surface of the ribbon between the nodes at 136 would be coated with the stop-off material to prevent adherence and provide a ribbon which for all practical purposes is the same as that shown in FIG. 5 and will form the same cellular structure.

In FIGS. 19 and 20, there is illustrated a ribbon 138 having wide bands of stop-off material 140 coated on the upper surface and narrow bands 142 coated on the lower surface. It will be noted that the wide bands 140 on the upper surface are offset from the narrow bands 142 on the lower surface. The ribbons 138 are stacked with the narrow bands 142 on the lower surface of the sheets are offset laterally one-half the distance between the bands 140 or 142 and positioned at the center of the bands 140 (FIG. 20). The bands on the lower surface will displace the uncoated upper surface 143 into a portion of the uncoated lower surface 141 on the superposed ribbon when the stacked ribbons are subject to pressure, thereby providing an area of metal to metal contact during the welding operation.

The ribbons 138 are very easily made and the contacting areas 143 and 141 are defined between the bands 140 and 142, respectively. The forming or folding operations used for the ribbons of FIGS. 1, 5, 10, 11, 16, and 18 are not required.

In FIG. 21 there is illustrated an arrangement of ribbons such as that shown in FIG. 11, wherein a node forming ridge 144 is formed on only one marginal edge of ribbon 146. They may be arranged as shown in FIG. 21 for the purpose of forming a cell of the type generally shown in FIG. 13, or slightly differently arranged to form the cell shown in FIG. 15, the stop-off material being coated on the surfaces where no welding is to take place.

Honeycomb core made in accordance with the foregoing description can be made in a variety of shapes and contours by choosing ribbons, foils, or sheets having the desired shape and stacking these ribbons, foils, or sheets in such manner as to produce the honeycomb contour. Another method of obtaining contoured honeycomb is to grind the expanded core block by conventional abrasive grinding, but preferably by my improved grinding method as described in my copending application Serial No. 310,244, filed September 18, 1952, and entitled "Method and Apparatus for Electrolytic Cuttings, Shaping and Grinding," issued as Patent No. 2,826,540, dated March 11, 1958.

FIGS. 22 to 25 illustrate two forms of contoured core made by selected ribbons of a particular size and shape in each instance. The tubular core 150 is made of a plurality of annular sheets 152 coated on one face with wide segments 154 of stop-off material and on its opposite face with narrow strips 156 of stop-off material, the segments 154 and strips 156 corresponding, respectively, to the wide and narrow bands 140 and 142 of FIGS. 19 and 20. The annular sheets 152 are stacked as taught in FIG. 20, to produce the core 150.

FIGS. 24 and 25 illustrate the method of making a parti-spherical core by using a plurality of sheets 158 of different sizes of a circular segment. Each sheet 158 is interleaved between a smaller and a larger sheet.

The method of this invention lends itself to the making of honeycomb core with high columnar strength by making the nodes, several times heavier than the foil. FIG. 26 illustrates a core 160 of airfoil configuration having heavy columnar nodes 162 adjacent the leading edge and lighter column 164 in the other portions of the core.

In FIG. 27 there is illustrated a core 166 similar to that shown in FIG. 4, with the addition of a set of fastening columnar pieces 168 between two of the ribbons and to which the nodes 32 and 34 are welded. The foils must be supported between the columnar pieces 168 during the welding step by stop-off or similar material. The columnar pieces 168, in addition to adding strength to the honeycomb core, provides means for welding or otherwise securing a skin to the core 166.

While several embodiments of the method of making honeycomb cores constituting this invention have been shown and described, it will be apparent that numerous further modifications and variations may be made without departing from the underlying principles of the invention. It is, therefore, desired by the following claims

What is claimed as new and desired to be secured by United States Letters Patent is:

1. In the method of making honeycomb core, the steps including defining a plurality of spaced parallel nodes on at least one face of a large number of foils, stopping off the spaces between adjacent nodes on each foil with a pressure transmitting stop-off material, stacking the foils so that the exposed surface of each node contacts exposed foil material on the superposed foil, and subjecting the stacked foils to heat to uniformly raise the temperature of all the foils to diffusion welding temperature and simultaneously subjecting said stack to static compressional forces applied uniformly simultaneously throughout the entire stack permanently to weld the contacted node surfaces and foil surfaces of superposed foils without appreciable attenuation of the foil material.

2. In the method of making honeycomb core, the steps including defining a pair of spaced parallel nodes along the longitudinal edges of one face of a large number of foils, stopping off the space between the nodes on each foil with a pressure transmitting stop-off material, stacking and interleaving the foils so that the foils are arranged longitudinally parallel in close side-by-side position and are displaced laterally predetermined equal distances between nodes and so that the exposed surface of each node contacts exposed foil material on the superposed foil, and subjecting the stacked foils to heat through the contacted node and foil surfaces and the supporting stop-off material, whereby the contacted node surfaces and foil surfaces of superposed foils are pressure welded together while maintaining the original foil thicknesses.

3. The method of making honeycomb core including the steps of defining a plurality of spaced parallel nodes on at least one face of a large number of foils by stopping off the spaces between adjacent nodes on each foil with a layer of stop-off material, stacking the foils so that the exposed surface of each node contacts exposed foil material on an adjacent foil, raising the temperature of the contacted node and foil areas above room temperature but below heat welding temperature to facilitate the union of the metals while applying pressure for an extended period of time in a direction only normal to the plane to thereby cause diffusion welding of the contacted node and foil surfaces without appreciable attenuation of the foil material, and thereafter expanding the welded foils into a honeycomb core exclusively by bending the foils without drawing the metal or attenuating the same.

References Cited by the Examiner

UNITED STATES PATENTS

| | | | |
|---|---|---|---|
| 726,026 | 4/03 | Canda | 29—483 |
| 924,413 | 6/09 | Astruc | 29—494 |
| 928,701 | 7/09 | Rietzel | 29—482 X |
| 2,089,242 | 8/37 | Whitesell | 29—180 |
| 2,152,297 | 3/39 | Wilson | 29—180 |
| 2,473,712 | 6/49 | Kinney | 29—196.6 X |
| 2,481,046 | 9/49 | Scurlock | 29—455 |
| 2,691,815 | 10/54 | Boessenkool | 29—497.5 |
| 2,746,139 | 5/56 | Van Pappelendam | 29—455 |
| 2,756,496 | 7/56 | Holland | 29—455 |
| 2,759,246 | 8/56 | Campbell | 29—157.3 X |
| 2,766,514 | 10/56 | Adams | 29—157.3 |
| 2,816,355 | 12/57 | Herman. | |
| 2,851,770 | 9/58 | Fromson | 29—470.9 X |
| 2,882,588 | 4/59 | Rieppel et al. | 29—157.3 |
| 2,900,807 | 8/59 | Solly | 62—277 |
| 2,999,306 | 9/61 | Baxter | 29—455 X |

WHITMORE A. WILTZ, *Primary Examiner.*

NEDWIN BERGER, JOHN F. CAMPBELL, *Examiners.*